W. C. BUCKNAM.
CHANGE SPEED GEARING.
APPLICATION FILED AUG. 23, 1918.
1,338,974.
Patented May 4, 1920.
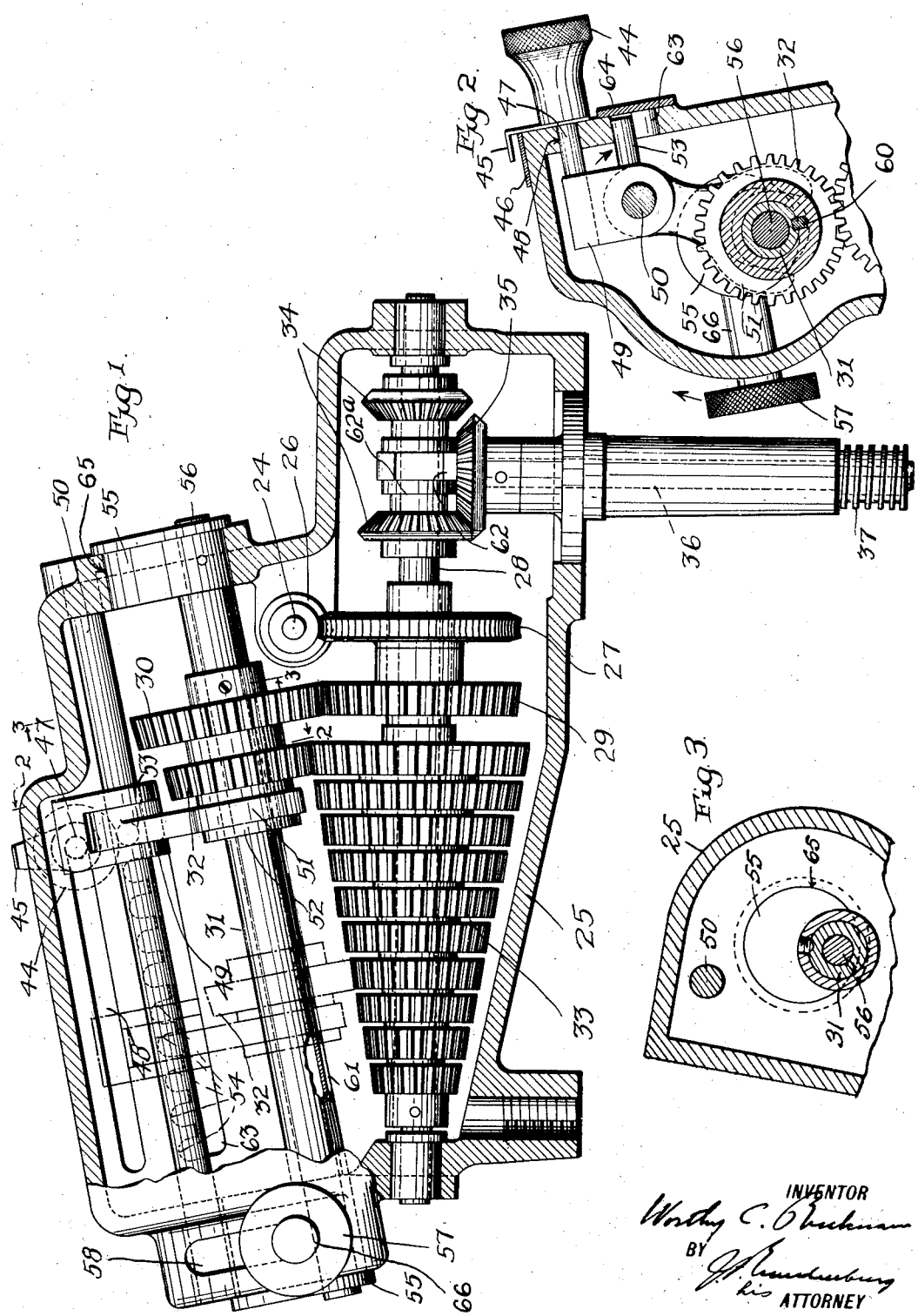

UNITED STATES PATENT OFFICE.

WORTHY C. BUCKNAM, OF JERSEY CITY, NEW JERSEY, ASSIGNOR TO DAVIS-BOURNONVILLE COMPANY, OF NEW YORK, N. Y., A CORPORATION OF NEW YORK.

CHANGE-SPEED GEARING.

1,338,974.   Specification of Letters Patent.   Patented May 4, 1920.

Application filed August 23, 1918. Serial No. 251,062.

*To all whom it may concern:*

Be it known that I, WORTHY C. BUCKNAM, a citizen of the United States, and a resident of Jersey City, in the county of Hudson and State of New Jersey, have invented a new and useful Change-Speed Gearing, of which the following is a specification.

The object of this invention is to provide a simple and advantageous change speed gearing of the cone-of-gears type affording a substantial range of speed variation. The gearing herein disclosed is particularly designed for the gas cutting apparatus forming the subject-matter of my Patent No. 1,318,725, dated October 14, 1919, but is not limited thereto.

In the accompanying drawings:

Figure 1 is a side sectional elevation of the gearing;

Fig. 2 is a cross-sectional elevation on the line 2—2 of Fig. 1; and

Fig. 3 is a similar view on the line 3—3 of Fig. 1.

The gearing is shown inclosed in a suitable case 25, which is entered from one side by a driving shaft 24 bearing a worm 26. The said worm meshes with a worm wheel 27 on a shaft 28, the worm wheel being free to rotate relatively to the shaft. A gear 29 is united to the worm wheel 27, is rotated therewith, and meshes with another gear 30, which is fixed to a tubular countershaft 31. Another gear 32 is connected with this shaft by means of a key 60 and a groove 61 in such manner that it is free to slide upon the shaft while being united therewith in respect to rotation. This gear may mesh with any one of a series of graduated gears 33 forming a cone united to the shaft 28. The tubular shaft 31 is set at an inclination to the shaft 28, paralleling one side of the cone.

The shaft 28 bears two spaced beveled gears 34, which may be brought alternately into mesh with a beveled gear 35 on the inner end of the shaft 36, which extends outside of the case, and is represented as bearing a worm 37 for driving an external part. The gears 34 are slidably splined to the shaft 28, and may be moved axially by a suitable shifter 62 engaging a sleeve 62ª uniting them.

The gear 32 is shifted lengthwise of the cone by means of a shifter fork 51 engaging a grooved collar 52 on the gear operated by an external handle 44. The said handle has a stem 47 passing through and movable longitudinally within a slot 48 in the wall of the case, and the inner end of said stem is united with a yoke 49, which is slidably mounted upon an internal rod 50, embracing the hub of the shifter fork 51, which is capable of both sliding and pivotal movement upon the rod.

The sliding and tilting shifter element 51 is provided with a projecting pin 53 which operates in a slot 63 parallel with the slot 48 and having holding notches 54 in one edge. The slot 63 may be covered by a plate 64, and the handle 44 has a pointer 45 coöperating with a suitable external scale 46.

The tubular shaft 31 is rotatable upon a fixed shaft or tie rod 56, the opposite ends of which are secured to a pair of eccentrics 55 which are journaled in circular openings 65 in the ends of the case. The eccentrics 55 and the shaft 56 thus constitute a rigid frame which may be oscillated in the bearing openings of the case in order to move the gear 32 laterally into and out of operative relation to the cone of gears 33. This oscillation is effected by means of a handle 57 having a stem 66 passing through a slot 58 and united with one of the eccentrics 55. The movement of this handle to disengage the gear 32 from the member of the cone of gears wherewith it was formerly in mesh also rocks the shifter element 51 so as to disengage the pin 53 from the corresponding holding notch. The handle 44 may now be moved lengthwise to the point which will bring the gear 32 opposite the desired gear of the cone 33, whereupon the handle 57 will be restored to its normal position. This will bring the gears into mesh and will lock the pin 53 with one of the notches 54.

What I claim as new is:

1. A change speed gearing comprising a cone of gears, a shaft paralleling the side of the cone, a guide rod parallel with said shaft, a gear slidable on the shaft lengthwise of the cone, an eccentric support for the shaft, a shifter member mounted slidably on said rod and having a handle, another shifter member connected with the slidable gear and mounted for sliding and pivotal movement on said rod in position to be moved lengthwise thereon by the first shifter member, a projection on the slidable and tiltable shifter member, and means affording a series of locking notches to coöperate with said projection.

2. A change speed gearing, comprising a cone of gears, a shaft paralleling a side of the cone, a gear slidable on said shaft lengthwise of the cone, an eccentric support for the shaft, a shifter for the gear comprising a slidable member having a handle and a second member pivotally jointed with respect to the first engaging the slidable gear and having a locking projection, and means affording a series of locking notches to coöperate with said projection.

WORTHY C. BUCKNAM.